(12) United States Patent  
Aoyama et al.

(10) Patent No.: US 11,309,811 B2  
(45) Date of Patent: Apr. 19, 2022

(54) ELECTRIC WORKING MACHINE AND MOTOR CONTROLLER

(71) Applicant: MAKITA CORPORATION, Anjo (JP)

(72) Inventors: Kiyoshi Aoyama, Anjo (JP); Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 94 days.

(21) Appl. No.: 17/013,977

(22) Filed: Sep. 8, 2020

(65) Prior Publication Data

US 2021/0083603 A1   Mar. 18, 2021

(30) Foreign Application Priority Data

Sep. 12, 2019   (JP) .............................. JP2019-166626

(51) Int. Cl.
  *H02P 3/20*   (2006.01)
  *H02P 3/22*   (2006.01)

(52) U.S. Cl.
  CPC . *H02P 3/20* (2013.01); *H02P 3/22* (2013.01)

(58) Field of Classification Search
  CPC .................. H02P 3/10; H02P 3/20; H02P 3/22
  USPC ....... 318/763, 299, 515, 516, 56, 57, 63, 86, 318/134, 400.09, 703, 362
  See application file for complete search history.

(56) References Cited

U.S. PATENT DOCUMENTS

| 5,083,067 A | 1/1992 | Soushin et al. | |
| 10,541,539 B1* | 1/2020 | Miyake | ............... H02M 1/4225 |
| 2019/0214933 A1* | 7/2019 | Saha | ....................... H02P 27/08 |

FOREIGN PATENT DOCUMENTS

| CN | 1211649 A | * 3/1999 | |
| CN | 101595633 A | * 12/2009 | ........... B62D 5/0487 |
| JP | H03-74194 A | 3/1991 | |
| JP | 2000325687 A | * 11/2000 | |

* cited by examiner

*Primary Examiner* — Jorge L Carrasquillo  
(74) *Attorney, Agent, or Firm* — Oliff PLC

(57) ABSTRACT

An electric working machine may include a brushless motor and a motor controller. The motor controller may include three upper switching elements, three lower switching elements, and a control unit. The control unit may be configured to execute a short-circuit braking operation for applying a braking force to the brushless motor by bringing the three upper switching elements into a non-conductive state and bringing the three lower switching elements into a conductive state. The control unit may be configured to start the short-circuit braking operation at a predetermined timing. When the short-circuit braking operation is started at the predetermined timing, polarities of induced voltages of first to third phase terminals of the brushless motor are reversed by a time when an electrical angle of the brushless motor increases by 180 degrees from the start of the short-circuit braking operation.

11 Claims, 12 Drawing Sheets

Time

Rotor Angle

ELECTRIC WORKING MACHINE AND MOTOR CONTROLLER

CROSS-REFERENCE TO RELATED APPLICATION

This application claims priority to Japanese Patent Application No. 2019-166626, filed on Sep. 12, 2019, the entire contents of which are incorporated herein by reference.

TECHNICAL FIELD

The technique disclosed herein relates to an electric working machine and a motor controller.

BACKGROUND

Japanese Patent Application Publication No. H3-74194 describes an electric working machine. This electric working machine includes a brushless motor and a motor controller configured to control the brushless motor. The brushless motor includes a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller includes a first upper switching element connecting the first phase terminal and a positive-side potential of a power supply; a first lower switching element connecting the first phase terminal and a negative-side potential of the power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit is configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state.

SUMMARY

In an electric working machine as described above, the short-circuit braking operation generates induced voltages in the first phase terminal, the second phase terminal, and the third phase terminal, as a result of which inrush currents respectively flow through the first lower switching element, the second lower switching element, and the third lower switching element according to the induced voltages, as shown in FIG. 8. If any of the inrush currents is large, an amount of heat generation is increased in the lower switching element(s) through which the large inrush current(s) flows and the lower switching element(s) may be overheated. The disclosure herein provides a technique that lowers a maximum value of the inrush currents in a short-circuit braking operation.

The disclosure herein discloses an electric working machine. The electric working machine may comprise a brushless motor and a motor controller configured to control the brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may include a first upper switching element connecting the first phase terminal and a positive-side potential of a power supply; a first lower switching element connecting the first phase terminal and a negative-side potential of the power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. The control unit may be configured to start the short-circuit braking operation at a predetermined timing. When the short-circuit braking operation is started at the predetermined timing, polarities of induced voltages of the first phase terminal, the second phase terminal, and the third phase terminal may be reversed by a time when an electrical angle of the brushless motor increases by 180 degrees from a start of the short-circuit braking operation.

The disclosure herein further discloses a motor controller. The motor controller may be configured to control a brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may comprise a first upper switching element connecting the first phase terminal and a positive-side potential of a power supply; a first lower switching element connecting the first phase terminal and a negative-side potential of a power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. The control unit may be configured to start the short-circuit braking operation at a predetermined timing. When the short-circuit braking operation is started at the predetermined timing, polarities of induced voltages of the first phase terminal, the second phase terminal, and the third phase terminal may be reversed by a time when an electrical angle of the brushless motor increases by 180 degrees from a start of the short-circuit braking operation.

In the short-circuit braking operation, inrush currents in the lower switching elements become maximum by the time when the electrical angle increases by 180 degrees from the start of the short-circuit braking operation. In this time period, as exemplified in FIG. 10, if any of the first phase terminal, the second phase terminal, and the third phase terminal does not experience polarity reversion of its induced voltage (the first phase terminal in the example of FIG. 10), the inrush current keeps flowing in the same direction in the lower switching element (e.g., the first lower switching element) corresponding to the terminal, which results in a large inrush current in the lower switching element. On the contrary, as exemplified in FIG. 11, if each of the first phase terminal, the second phase terminal, and the third phase terminal experiences polarity reversion of the induced voltage by the time when the electrical angle increases by 180 degrees from the start of the short-circuit braking operation, directions of the inrush currents flowing in the lower switching elements are reversed, as a result of which a maximum value of the inrush currents is lowered in the lower switching elements. In the above-described configuration, the short-circuit braking operation is started at the timing when the polarities of the induced voltages of the first phase terminal, the second phase terminal, and the third phase terminal are reversed by the time when the electrical angle of the brushless motor increases by 180 degrees, thus the maximum value of the inrush currents in the short-circuit braking operation can be lowered.

The disclosure herein further discloses another electric working machine. This electric working machine may comprise a brushless motor and a motor controller configured to control the brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may include a first upper switching element connecting the first phase terminal and a positive-side potential of a power supply; a first lower switching element connecting the first phase terminal and a negative-side potential of the power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. Before executing the short-circuit braking operation, the control unit may be configured to execute a de-energization operation for bringing the first upper switching element, the first lower switching element, the second upper switching element, the second lower switching element, the third upper switching element, and the third lower switching element into the non-conductive state. The control unit may be configured to start the short-circuit braking operation at a timing when induced voltages of two of the first phase terminal, the second phase terminal, and the third phase terminal become substantially equal to each other after the de-energization operation.

When the control unit executes the de-energization operation during rotation of the brushless motor, the brushless motor continues rotating by inertia and sine-wave induced voltages are generated in the first phase terminal, the second phase terminal, and the third phase terminal, respectively. In this case, if the short-circuit braking operation is started at the timing when the induced voltages of two of the first phase terminal, the second phase terminal, and the third phase terminal (e.g., the first phase terminal and the third phase terminal) become equal to each other, inrush currents flowing in the lower switching elements corresponding to those two terminals (e.g., the first lower switching element and the third lower switching element) become substantially the same in magnitude, and an inrush current flowing in the lower switching terminal (e.g., the second lower switching element) corresponding to the remaining one terminal (e.g., the second phase terminal) becomes minimal in magnitude, in the time period from the start of the short-circuit braking operation until the electrical angle increases by 180 degrees. The above-described configuration can suppress concentration of inrush current flow in one of the lower switching elements, thus it can significantly lower a maximum value of the inrush currents.

DETAILED DESCRIPTION

Figure 1:
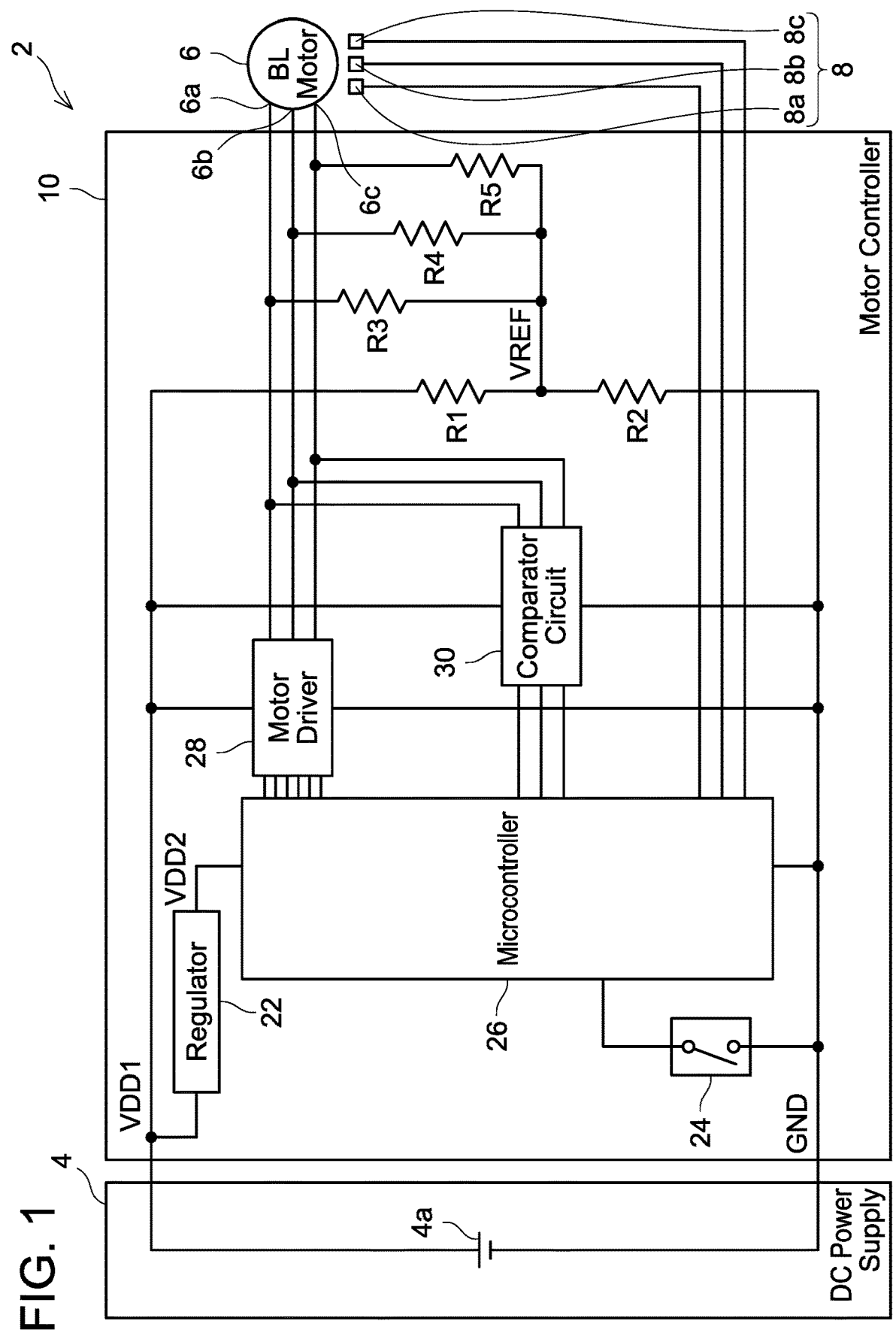
FIG. 1 shows an exemplary circuit configuration of an electric working machine 2 according to a first embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric working machines and motor controllers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electric working machine may comprise a brushless motor and a motor controller configured to control the brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may include a first upper switching element connecting the first phase terminal and a positive-side potential of a power supply; a first lower switching element connecting the first phase terminal and a negative-side potential of the power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. The control unit may be configured to start the short-circuit braking operation at a predetermined timing. When the short-circuit braking operation is started at the predetermined timing, polarities of induced voltages of the first phase terminal, the second phase terminal, and the third phase terminal may be reversed by a time when an electrical angle of the brushless motor increases by 180 degrees from the start of the short-circuit braking operation.

In one or more embodiments, a motor controller may be configured to control a brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may comprise a first upper switching element connecting the first phase terminal and a positive-side potential of a power supply; a first lower switching element connecting the first phase terminal and a negative-side potential of a power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. The control unit may be configured to start the short-circuit braking operation at a predetermined timing. When the short-circuit braking operation is started at the predetermined timing, polarities of induced voltages of the first phase terminal, the second phase terminal, and the third phase terminal may be reversed by a time when an electrical angle of the brushless motor increases by 180 degrees from the start of the short-circuit braking operation.

In one or more embodiments, before executing the short-circuit braking operation, the above-described control unit may be configured to execute a de-energization operation for bringing the first upper switching element, the first lower switching element, the second upper switching element, the second lower switching element, the third upper switching element, and the third lower switching element into the non-conductive state. The control unit may be configured to start the short-circuit braking operation at a timing when the induced voltages of two of the first phase terminal, the second phase terminal, and the third phase terminal become substantially equal to each other after the de-energization operation. Herein, "induced voltages of two of the first phase terminal, the second phase terminal, and the third phase terminal become substantially equal to each other" means that the two induced voltages are in a ±10% difference range.

In one or more embodiments, an electric working machine may comprise a brushless motor and a motor controller configured to control the brushless motor. The brushless motor may include a rotor including a plurality of magnetic poles, a stator including a plurality of teeth facing the rotor, and coils wound around the teeth and configured to generate magnetic forces in the teeth according to voltages applied on a first phase terminal, a second phase terminal, and a third phase terminal. The motor controller may include a first upper switching element connecting the first phase terminal and a positive-side potential of a power supply; a first lower switching element connecting the first phase terminal and a negative-side potential of the power supply; a second upper switching element connecting the second phase terminal and the positive-side potential of the power supply; a second lower switching element connecting the second phase terminal and the negative-side potential of the power supply; a third upper switching element connecting the third phase terminal and the positive-side potential of the power supply; a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state. The control unit may be configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state. Before executing the short-circuit braking operation, the control unit may be configured to execute a de-energization operation for bringing the first upper switching element, the first lower switching element, the second upper switching element, the second lower switching element, the third upper switching element, and the third lower switching element into the non-conductive state. The control unit may be configured to start the short-circuit braking operation at a timing when induced voltages of two of the first phase terminal, the second phase terminal, and the third phase terminal become substantially equal to each other after the de-energization operation.

When the control unit executes the de-energization operation during rotation of the brushless motor, the brushless motor continues rotating by inertia and sine-wave induced voltages are generated in the first phase terminal, the second phase terminal, and the third phase terminal, respectively. In this case, if the short-circuit braking operation is started at the timing when the induced voltages of two of the first phase terminal, the second phase terminal, and the third phase terminal (e.g., the first phase terminal and the third phase terminal) become equal to each other, inrush currents flowing in the lower switching elements corresponding to those two terminals (e.g., the first lower switching element and the third lower switching element) become substantially the same in magnitude and the inrush current flowing in the lower switching terminal (e.g., the second lower switching element) corresponding to the remaining one terminal (e.g., the second phase terminal) becomes minimal in magnitude by the time when the electrical angle increases by 180 degrees from the start of the short-circuit braking operation. The above-described configuration can suppress concentration of inrush current flow in one of the lower switching elements, thus it can significantly lower the maximum value of the inrush currents.

In one or more embodiments, the motor controller may further include a comparator configured to compare the induced voltages of the two of the first phase terminal, the second phase terminal, and the third phase terminal with each other. The control unit may be configured to start the short-circuit braking operation at a timing when an output of the comparator is inverted after the de-energization operation.

The above configuration enables the timing when the short-circuit braking operation is started to accurately coincide with the timing when the induced voltages of the two of the first phase terminal, the second phase terminal, and the third phase terminal become equal to each other.

In one or more embodiments, the motor controller may further include a first comparator configured to compare a reference potential with the induced voltage of one of the first phase terminal, the second phase terminal, and the third phase terminal. The control unit may be configured to start the short-circuit braking operation at a timing when an electrical angle of the brushless motor increases by 30 degrees from inversion of an output of the first comparator after the de-energization operation.

In situation where the brushless motor is rotating by inertia, when the electrical angle increases by 30 degrees from a timing when the reference potential became equal to the induced voltage of one of the first phase terminal, the second phase terminal, and the third phase terminal, the induced voltages of two of the first phase terminal, the second phase terminal, and the third phase terminal become equal to each other. Thus, the above configuration enables the timing when the short-circuit braking operation is started to accurately coincide with the timing when the induced voltages of the two of the first phase terminal, the second phase terminal, and the third phase terminal become equal to each other.

In one or more embodiments, the motor controller may further include a second comparator configured to compare the reference potential with the induced voltage of another one of the first phase terminal, the second phase terminal, and the third phase terminal. The control unit may be configured to determine a time period required for the electrical angle of the brushless motor to increase by 30 degrees based on a time period from a timing when the output of the first comparator is inverted after the de-energization operation to a timing when an output of the second comparator is inverted after the de-energization operation.

In situation where the brushless motor is rotating by inertia, when the electrical angle increases by 60 degrees from the timing when the reference potential became equal to the induced voltage of one of the first phase terminal, the second phase terminal, and the third phase terminal, the induced voltage of another one of the first phase terminal, the second phase terminal, and the third phase terminal becomes equal to the reference potential. Thus, by measuring a time period from the timing when the reference potential becomes equal to the induced voltage of the one of the first phase terminal, the second phase terminal, and the third phase terminal to the timing when the reference potential becomes equal to the induced voltage of the other one of the first phase terminal, the second phase terminal, and the third phase terminal, a time period required for the electrical angle to increase by 60 degrees can be determined and a time period required for the electrical angle to increase by 30 degrees can also be determined from that determined time period. The above configuration can accurately determine the time period required for the electrical angle to increase by 30 degrees in the actual brushless motor.

In one or more embodiments, the brushless motor may further include a Hall element configured to detect a change in a magnetic force from the rotor, and a position of the Hall element relative to the stator may be fixed. The control unit may be configured to determine a timing when one of the magnetic poles of the rotor faces one of the teeth of the stator based on a detection signal from the Hall element and start the short-circuit braking operation at the determined timing.

In situation where the brushless motor is rotating by inertia, the timing when the induced voltages of two of the first phase terminal, the second phase terminal, and the third phase terminal become equal to each other is also the timing when one of the magnetic poles of the rotor faces one of the teeth of the stator. In the above configuration, the Hall element is used to determine the timing when one of the magnetic poles of the rotor faces one of the teeth of the stator, and the short-circuit braking operation is started at the determined timing. The above configuration can suppress concentration of inrush current flow in one of the lower switching elements, thus it can significantly lower the maximum value of the inrush currents.

EMBODIMENTS

First Embodiment

An electric working machine 2 shown in FIG. 1 includes a DC power supply 4, a brushless motor 6, a Hall sensor 8, and a motor controller 10. In the electric working machine 2, electric power from the DC power supply 4 is supplied to the brushless motor 6 through the motor controller 10. The electric working machine 2 may be a power tool configured to machine a workpiece with a tool (not shown) driven by the brushless motor 6, or may be an electric working machine, other than power tools, which is configured to execute various work by driving a fan (not shown) or a wheel (not shown) by the brushless motor 6, for example.

Figure 15:
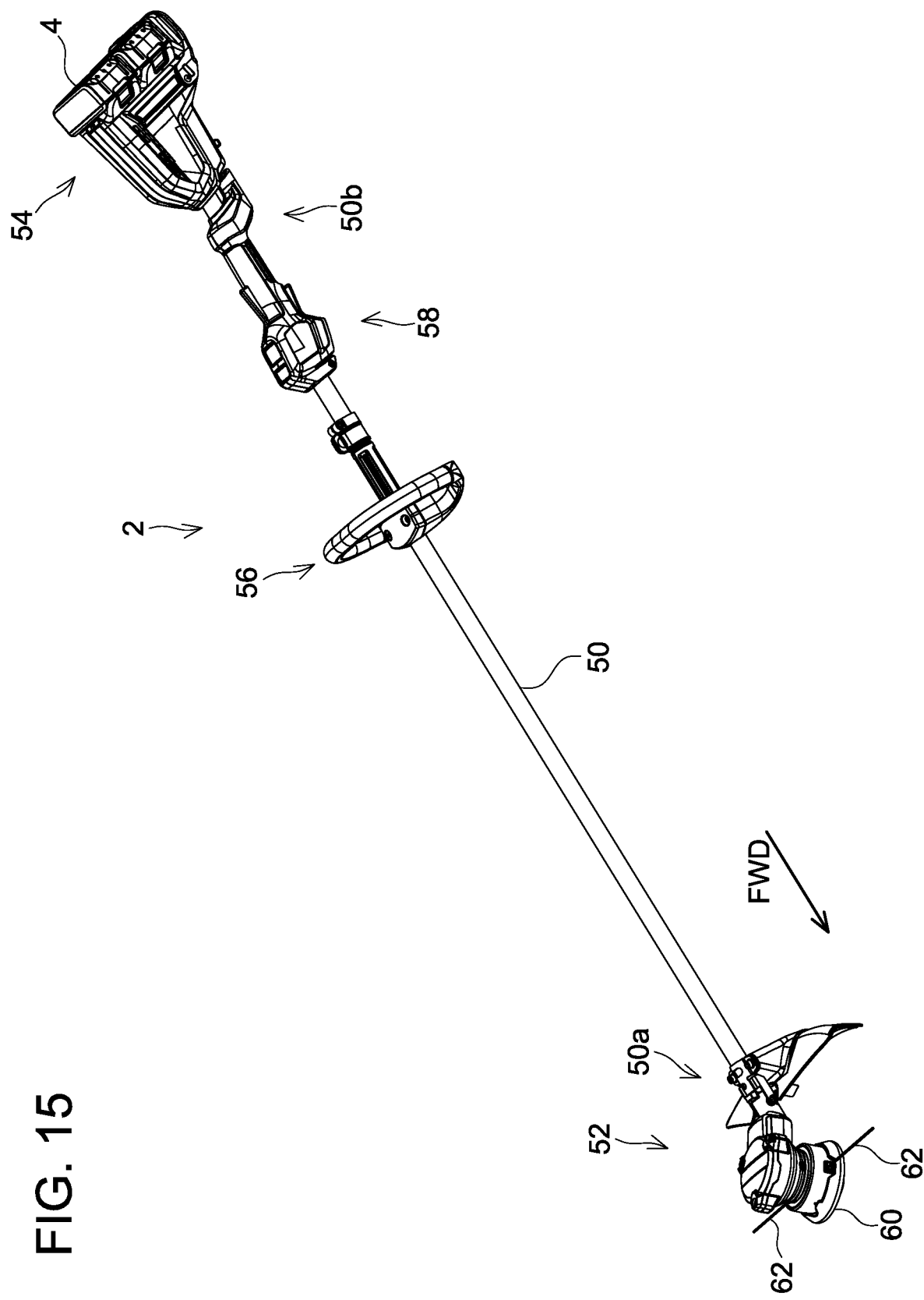
FIG. 15 shows a perspective view of the electric working machine 2, 102 according to the first and second embodiments, which are implemented as a trimmer.

As shown in FIG. 15, the electric working machine 2 may be a trimmer used to trim vegetation, for example. In the example of FIG. 15, the electric working machine 2 includes a support rod 50, a front end unit 52 disposed at a front end 50a of the support rod 50, a rear end unit 54 disposed at a rear end 50b of the support rod 50, a loop handle 56 disposed at an intermediate portion of the support rod 50, and a grip 58 disposed between the loop handle 56 and the rear end unit 54 of the support rod 50. The DC power supply 4 and the motor controller 10 (not shown in FIG. 15) are disposed in the rear end unit 54. The brushless motor 6 (not shown in FIG. 15), the Hall sensor 8 (not shown in FIG. 15), and a line holder 60 are disposed in the front end unit 52. The line holder 60 is configured to be rotated by the brushless motor 6. The line holder 60 holds a string-shaped cutter lines 62. Ends of the cutter lines 62 are drawn out from the line holder 60 and configured to rotate with the line holder 60. In the example of FIG. 15, the electric working machine 2 cuts grass and bushes by the cutter lines 62 rotating at high speed.

As shown in FIG. 1, the DC power supply 4 is, for example, a battery pack that houses a battery 4a therein and is detachably attached to the electric working machine 2. The battery 4a is, for example, a secondary battery such as a lithium-ion battery.

Figure 2:
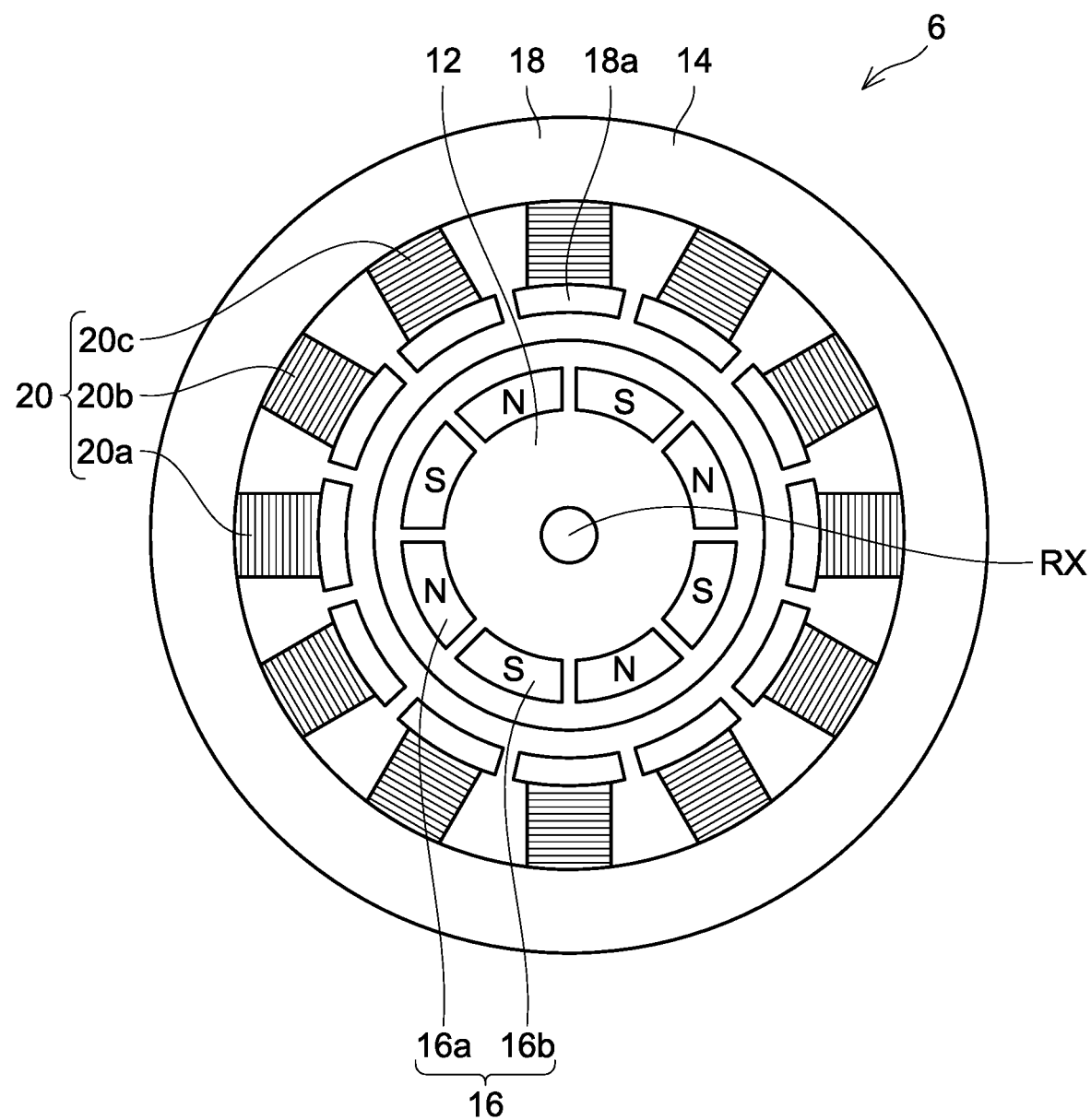
FIG. 2 schematically shows an exemplary mechanical configuration of a brushless motor 6 according to the first embodiment.

As shown in FIG. 2, the brushless motor 6 is a brushless motor of an inner rotor type and includes a rotor 12 configured to be rotatable about a rotation axis RX and a stator 14 disposed around the rotor 12. The rotor 12 is constituted of a permanent magnet, and north poles 16a and south poles 16b are arranged alternately on a surface of the rotor 12 along a circumferential direction thereof. Hereinbelow, the north poles 16a and the south poles 16b may be collectively termed magnetic poles 16. The stator 14 includes a core 18 and coils 20. The core 18 includes a plurality of teeth 18a protruding toward the rotor 12. In the example of FIG. 2, eight magnetic poles 16 are arranged on the surface of the rotor 12 and the core 18 includes twelve teeth 18a. The coils 20 include a first coil 20a, a second coil 20b, and a third coil 20c. Each of the first coil 20a, the second coil 20b, and the third coil 20c is wound around corresponding one of the teeth 18a.

The first coil 20a, the second coil 20b, and the third coil 20c may be in a so-called delta connection as shown in FIG. 2c, or may be in a so-called star connection as shown in FIG.

6. In case of the delta connection shown in FIG. 5, the first coil 20a connects a first phase terminal 6a and a second phase terminal 6b to each other, the second coil 20b connects the second phase terminal 6b and a third phase terminal 6c to each other, and the third coil 20c connects the third phase terminal 6c and the first phase terminal 6a to each other. In case of the star connection shown in FIG. 6, the first coil 20a connects the first phase terminal 6a and a neutral point 6d to each other, the second coil 20b connects the second phase terminal 6b and the neutral point 6d to each other, and the third coil 20c connects the third phase terminal 6c and the neutral point 6d to each other.

As shown in FIG. 1, the brushless motor 6 includes the Hall sensor 8. The Hall sensor 8 includes, for example, a first Hall element 8a, a second Hall element 8b, and a third Hall element 8c. Positions of the first Hall element 8a, the second Hall element 8b, and the third Hall element 8c are fixed relative to the stator 14, and these elements are configured to detect changes in magnetic forces from the magnetic poles 16 of the rotor 12. For example, the first Hall element 8a is disposed near the first coil 20a, the second Hall element 8b is disposed near the second coil 20b, and the third Hall element 8c is disposed near the third coil 20c.

As shown in FIG. 1, the motor controller 10 includes a regulator 22, a switch circuit 24, a microcontroller 26, a motor driver circuit 28, and a comparator circuit 30.

The regulator 22 is configured to reduce a voltage of DC power from the DC power supply 4 to a predetermined voltage (e.g., 5 V) and supply it to the microcontroller 26. In the motor controller 10, a negative side of the DC power supply 4 is connected to a ground potential GND, while a positive side of the DC power supply 4 is connected to a first potential VDD1 of power supply. Further, an output of the regulator 22 is connected to a second potential VDD2 of power supply.

The switch circuit 24 is configured to switch between a conductive state and non-conductive state according to user's operations on a trigger switch (not shown in FIG. 1) of the electric working machine 2. The switch circuit 24 is configured to input a trigger operation signal to the microcontroller 26. When the user does not operate the trigger switch, the switch circuit 24 is in the non-conductive state and OFF (e.g., H potential) is inputted to the microcontroller 26 as the trigger operation signal. On the other hand, when the user operates the trigger switch, the switch circuit 24 is brought into the conductive state and ON (e.g., L potential) is inputted to the microcontroller 26 as the trigger operation signal.

When the trigger operation signal inputted by the switch circuit 24 is switched from OFF to ON, the microcontroller 26 rotates the brushless motor 6 via the motor driver circuit 28. Further, when the trigger operation signal inputted by the switch circuit 24 is switched from ON to OFF, the microcontroller 26 stops the brushless motor 6 via the motor driver circuit 28.

Figure 3:
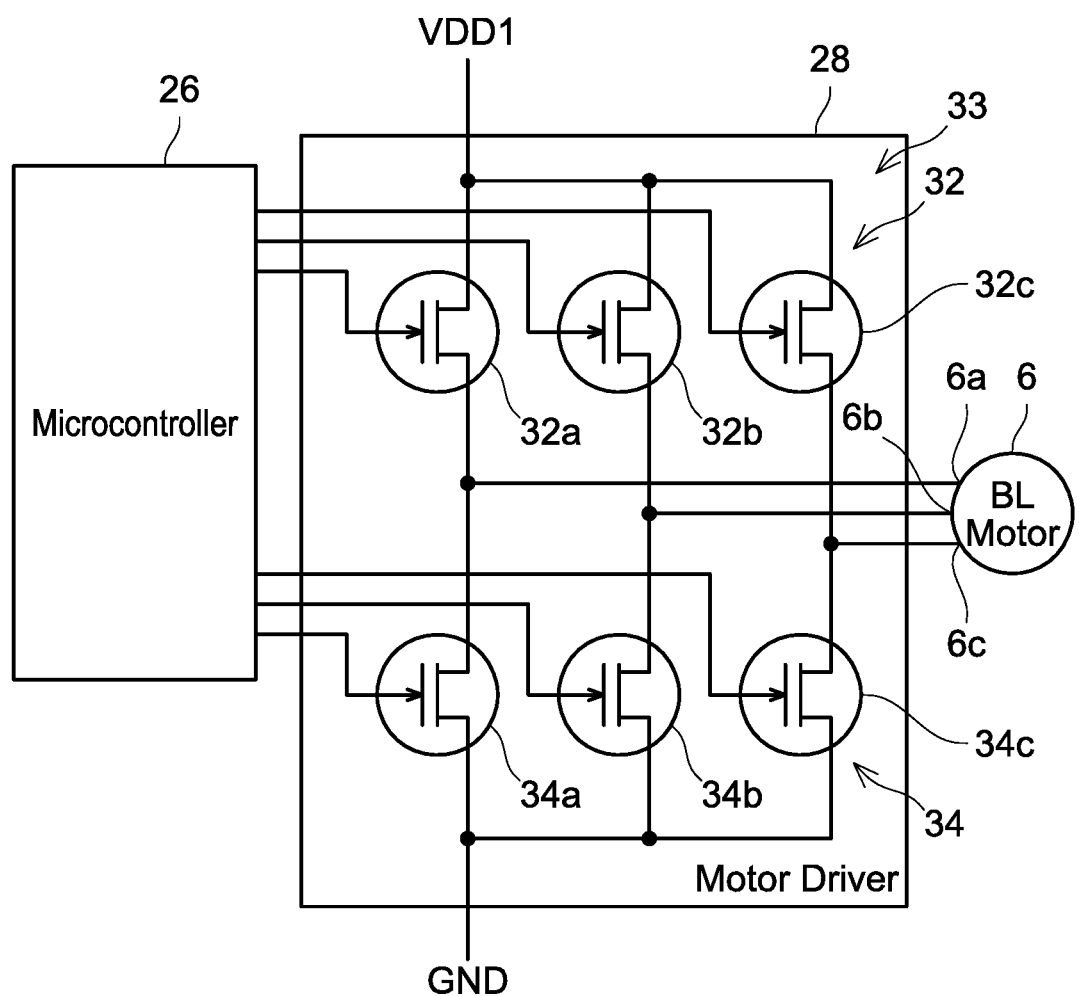
FIG. 3 shows an exemplary circuit configuration of a motor driver circuit 28 according to the first embodiment.

As shown in FIG. 3, the motor driver circuit 28 includes a plurality of switching elements 33. Each of the switching elements 33 is, for example, a metal-oxide semiconductor field-effect transistor (MOSFET). The plurality of switching elements 33 include a first upper switching element 32a, a first lower switching element 34a, a second upper switching element 32b, a second lower switching element 34b, a third upper switching element 32c, and a third lower switching element 34c. Hereinbelow, the first upper switching element 32a, the second upper switching element 32b, and the third upper switching element 32c may be collectively termed upper switching elements 32, and the first lower switching element 34a, the second lower switching element 34b, and the third lower switching element 34c may be collectively termed lower switching elements 34. The first upper switching element 32a connects the first potential VDD1 of power supply and the first phase terminal 6a of the brushless motor 6 to each other, and the first lower switching element 34a connects the ground potential GND and the first phase terminal 6a of the brushless motor 6 to each other. The second upper switching element 32b connects the first potential VDD1 of power supply and the second phase terminal 6b of the brushless motor 6 to each other, and the second lower switching element 34b connects the ground potential GND and the second phase terminal 6b of the brushless motor 6 to each other. The third upper switching element 32c connects the first potential VDD1 of power supply and the third phase terminal 6c of the brushless motor 6 to each other, and the third lower switching element 34c connects the ground potential GND and the third phase terminal 6c of the brushless motor 6 to each other.

The microcontroller 26 is configured to control voltages applied to the first coil 20a, the second coil 20b, and the third coil 20c of the brushless motor 6 by switching each of the switching elements 33 between a conductive state and a non-conductive state. Due to this, magnetic forces generated in the respective teeth 18a of the stator 14 change and the rotor 12 is thereby rotated relative to the stator 14. The microcontroller 26 identifies a rotation angle of the rotor 12 relative to the stator 14 from detection signals from the Hall sensor 8 and controls timings when each of the switching elements 33 is to be switched between the conductive state and the non-conductive state according to the rotation angle, to rotate the brushless motor 6 at a desired rotational speed.

Figure 5:
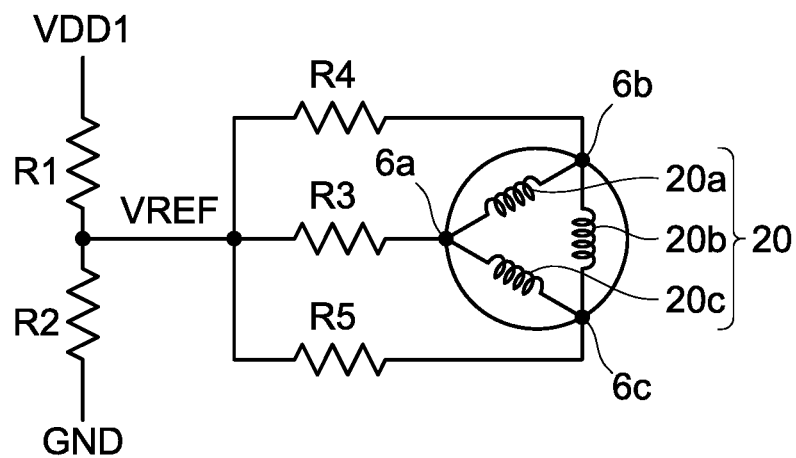
FIG. 5 shows an exemplary circuit configuration in the brushless motor 6 according to the first embodiment, with a first coil 20a, a second coil 20b, and a third coil 20c being in delta connection.
Figure 6:
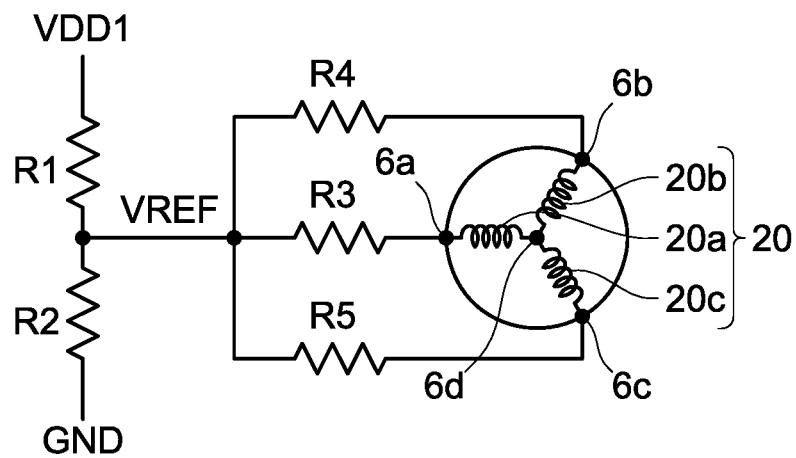
FIG. 6 shows an exemplary circuit configuration in the brushless motor 6 according to the first embodiment, with the first coil 20a, the second coil 20b, and the third coil 20c being in star connection.
Figure 7:
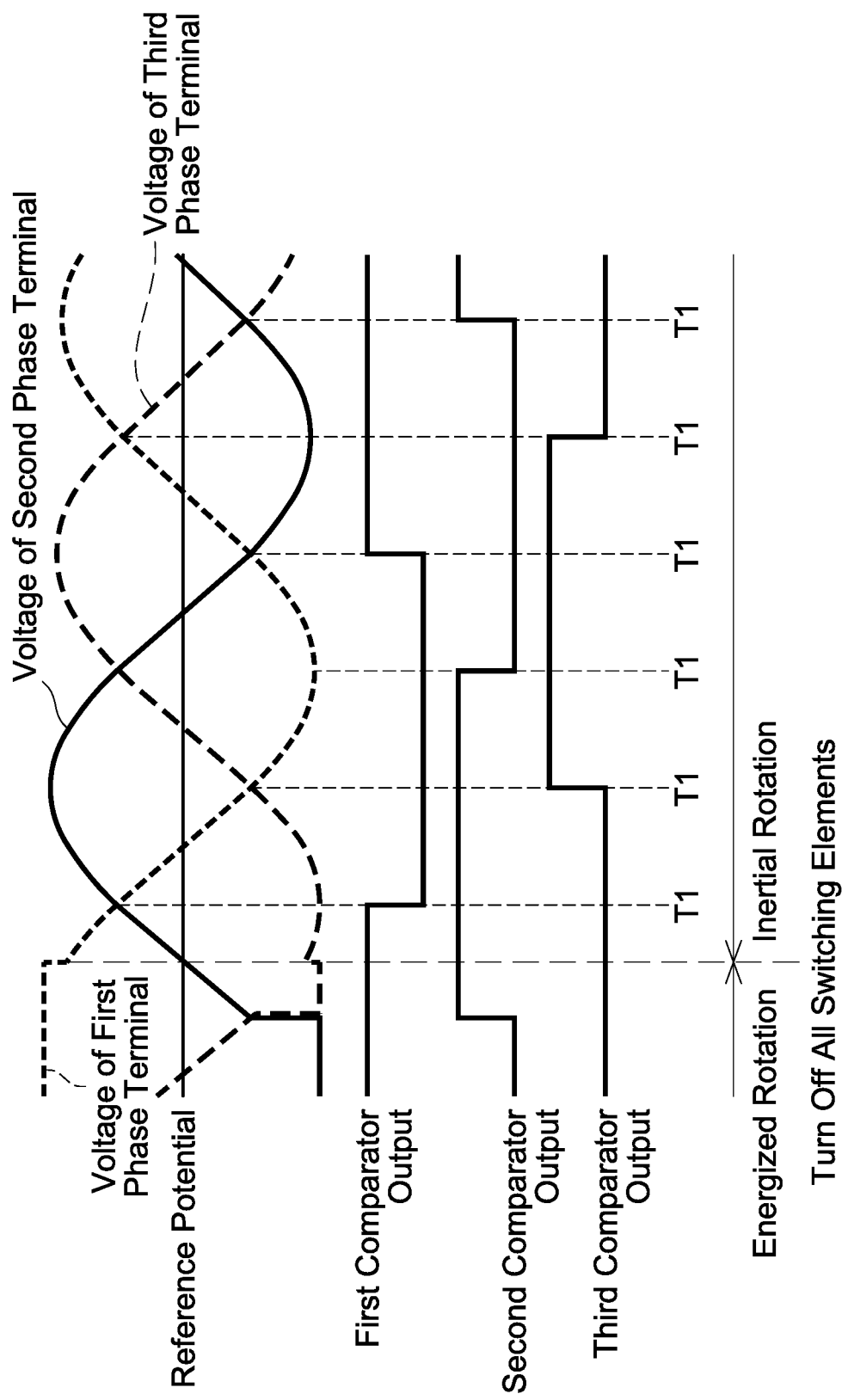
FIG. 7 shows a timing chart of the first embodiment indicating relationships between induced voltages of a first phase terminal 6a, a second phase terminal 6b, and a third phase terminal 6c while the brushless motor 6 is rotating by inertia and outputs from the comparator circuit 30.

When the microcontroller 26 brings all of the switching elements 33 into the non-conductive state during rotation of the brushless motor 6, power supply from the DC power supply 4 to the brushless motor 6 is thereby cut off. This operation of the microcontroller 26 may be termed a de-energization operation. As shown in FIG. 7, even though the microcontroller 26 executes the de-energization operation, the brushless motor 6 continues rotating by inertia and sine-wave induced voltages are generated in the first phase terminal 6a, the second phase terminal 6b, and the third phase terminal 6c. To prevent unstableness of amplitude center potential (which may be termed a reference potential hereinbelow) of the first phase terminal 6a, the second phase terminal 6b, and the third phase terminal 6c, the motor controller 10 includes resistors R1, R2, R3, R4, and R5 as shown in FIG. 1. As shown in FIGS. 5 and 6, the resistor R1 connects the first potential VDD1 of power supply and a reference potential VREF to each other, the resistor R2 connects the ground potential GND and the reference potential VREF to each other, the resistor R3 connects the first phase terminal 6a and the reference potential VREF to each other, the resistor R4 connects the second phase terminal 6b and the reference potential VREF to each other, and the resistor R5 connects the third phase terminal 6c and the reference potential VREF to each other. In the present embodiment, a resistance value of the resistor R1 and a resistance value of the resistor R2 are substantially the same. A resistance value of the resistor R3, a resistance value of the resistor R4, and a resistance value of the resistor R5 are substantially the same. The resistance value of the resistor R1 is sufficiently smaller than the resistance value of the resistor R3, for example, it is equal to or less than one-tenth (1/10) of the resistance value of the resistor R3.

As described, the brushless motor 6 continues rotating by inertia, even though the microcontroller 26 executes the de-energization operation. Thus, to stop the brushless motor 6, the microcontroller 26 brings all of the first upper switching element 32a, the second upper switching element 32b, and the third upper switching element 32c into the non-conductive state and brings all of the first lower switching element 34a, the second lower switching element 34b, and the third lower switching element 34c into the conductive state after executing the de-energization operation. This maintains all of the first phase terminal 6a, the second phase terminal 6b, and the third phase terminal 6c of the brushless motor 6 at the ground potential GND, thus a large braking force is applied to the rotor 12 by the stator 14, by which the brushless motor 6 immediately stops rotating. This operation of the microcontroller 26 may be termed a short-circuit braking operation.

Figure 8:
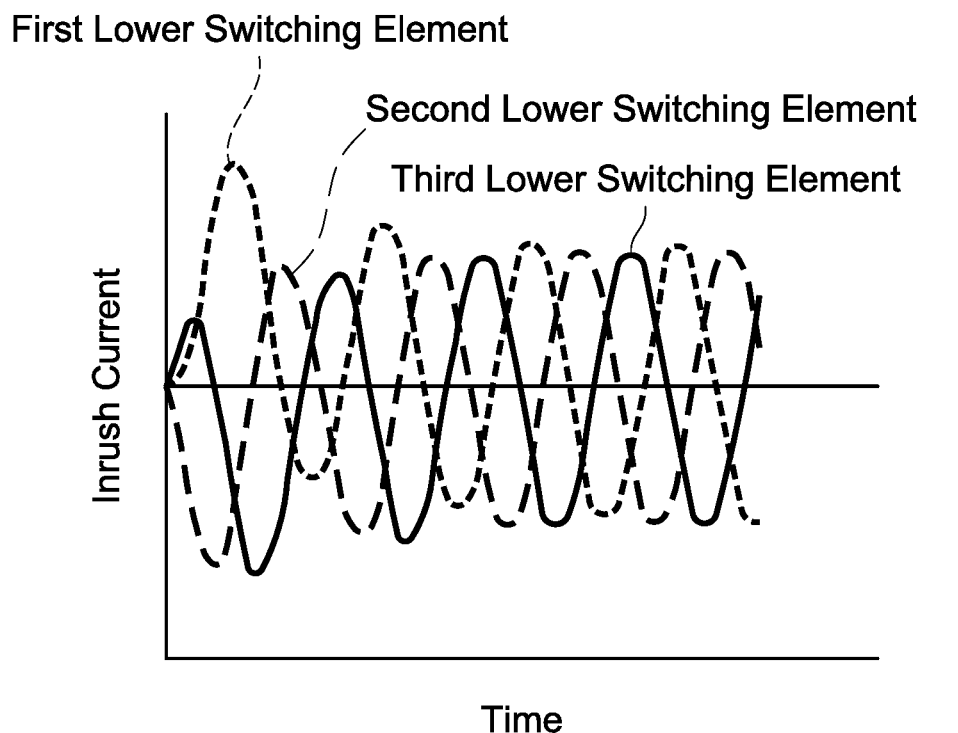
FIG. 8 is a graph showing an example of how inrush currents flowing in a first lower switching element 34a, a second lower switching element 34b, and a third lower switching element 34c change over time in a short-circuit braking operation of the brushless motor 6.

As shown in FIG. 8, at the time of the above-described short-circuit braking operation, inrush currents flow in the first lower switching element 34a, the second lower switching element 34b, and the third lower switching element 34c, respectively. If any of these inrush currents is large, an amount of heat generation is increased in the lower switching element(s) 34 in which the large inrush current(s) flows and the lower switching element(s) 34 may be overheated.

Figure 9:
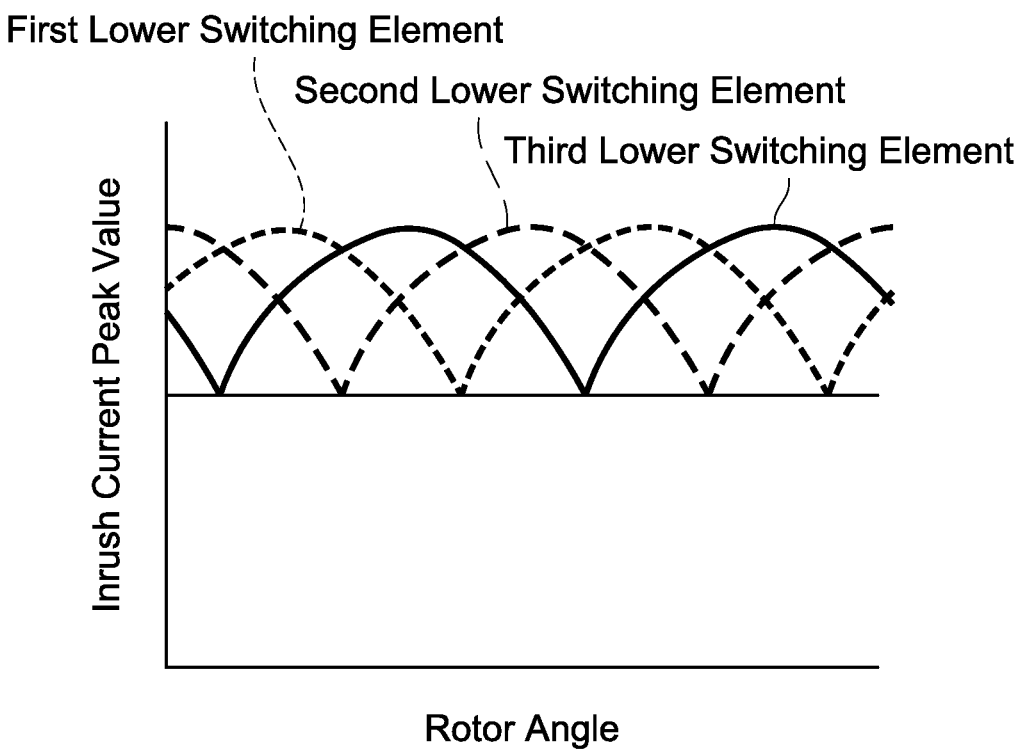
FIG. 9 is a graph showing relationships between rotation angle of a rotor 12 at the start of the short-circuit braking operation of the brushless motor 6 and values of inrush currents flowing in the first lower switching element 34a, the second lower switching element 34b, and the third lower switching element 34c.

As shown in FIG. 9, magnitudes of the inrush currents in the first lower switching element 34a, the second lower switching element 34b, and the third lower switching element 34c change according to the rotation angle of the rotor 12 at the start of the short-circuit braking operation. This is because behaviors of the induced voltages in the first phase terminal 6a, the second phase terminal 6b, and the third phase terminal 6c during the short-circuit braking operation change according to the rotation angle of the rotor 12 at the start of the short-circuit braking operation, and behavior of the inrush currents in the first lower switching element 34a, the second lower switching element 34b, and the third lower switching element 34c changes according to the behavioral changes in the induced voltages.

Figure 10:
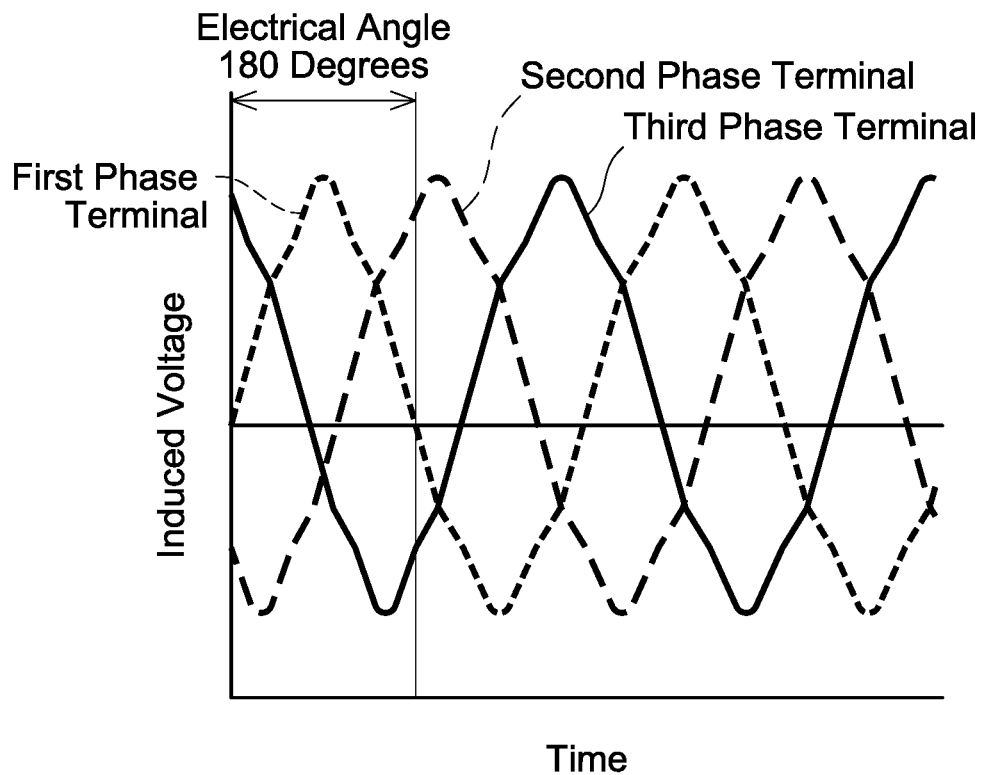
FIG. 10 shows an example of how induced voltages of the first phase terminal 6a, the second phase terminal 6b, and the third phase terminal 6c change over a time period from the start of the short-circuit braking operation of the brushless motor 6 to a timing when an electrical angle increases by 180 degrees.

In the short-circuit braking operation, the inrush currents in the lower switching elements 34 become maximum by the time when an electrical angle increases by 180 degrees from the start of the short-circuit braking operation. In this time period, as exemplified in FIG. 10, if any of the first phase terminal 6a, the second phase terminal 6b, and the third phase terminal 6c does not experience polarity reversion of its induced voltage, the inrush current(s) keeps flowing in the same direction in the lower switching element(s) 34 corresponding to the terminal(s), which results in large inrush current(s) in the lower switching element(s) 34. On the contrary, as exemplified in FIG. 11, if each of the first phase terminal 6a, the second phase terminal 6b, and the third phase terminal 6c experiences the polarity reversion of the induced voltage by the time when the electrical angle increases by 180 degrees from the start of the short-circuit braking operation, directions of the inrush currents flowing in the lower switching elements 34 are reversed, as a result of which the inrush currents are lowered in the lower switching elements 34.

Figure 11:
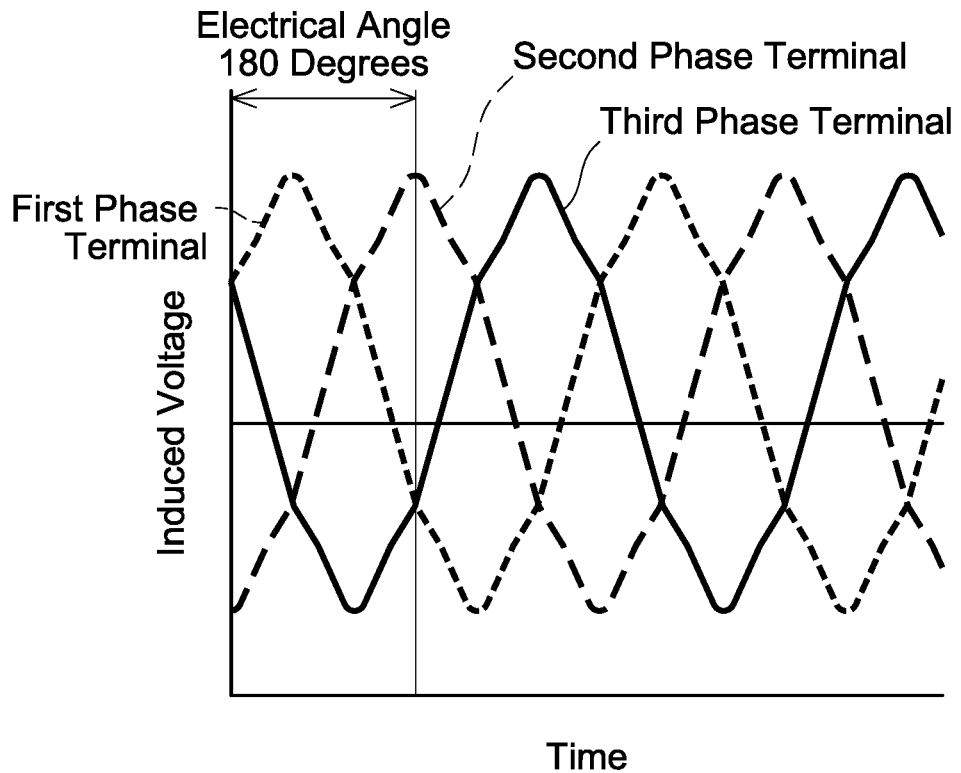
FIG. 11 shows another example of how induced voltages of the first phase terminal 6a, the second phase terminal 6b, and the third phase terminal 6c change over the time period from the start of the short-circuit braking operation of the brushless motor 6 to the timing when the electrical angle increases by 180 degrees.

As shown in FIG. 11, especially when the short-circuit braking operation is started at a timing the induced voltages of two of the first phase terminal 6a, the second phase terminal 6b, and the third phase terminal 6c (which are the first phase terminal 6a and the third phase terminal 6c in the example of FIG. 11) become equal to each other, the inrush currents flowing in the lower switching elements 34 (e.g., the first lower switching element 34a and the third lower switching element 34c) corresponding to those two terminals become substantially the same in magnitude, and the inrush current flowing in the lower switching element 34 (e.g., the second lower switching element 34b) corresponding to the remaining one terminal (e.g., the second phase terminal 6b) becomes minimal in magnitude, in the time period from the start of the short-circuit braking operation until the electrical angle increases by 180 degrees. Starting the short-circuit braking operation at such a timing suppresses concentration of inrush current flow in one of the lower switching elements 34, thus a maximum value of the inrush currents can be significantly lowered. The motor controller 10 of the present embodiment detects the above-described timing using the comparator circuit 30.

Figure 4:
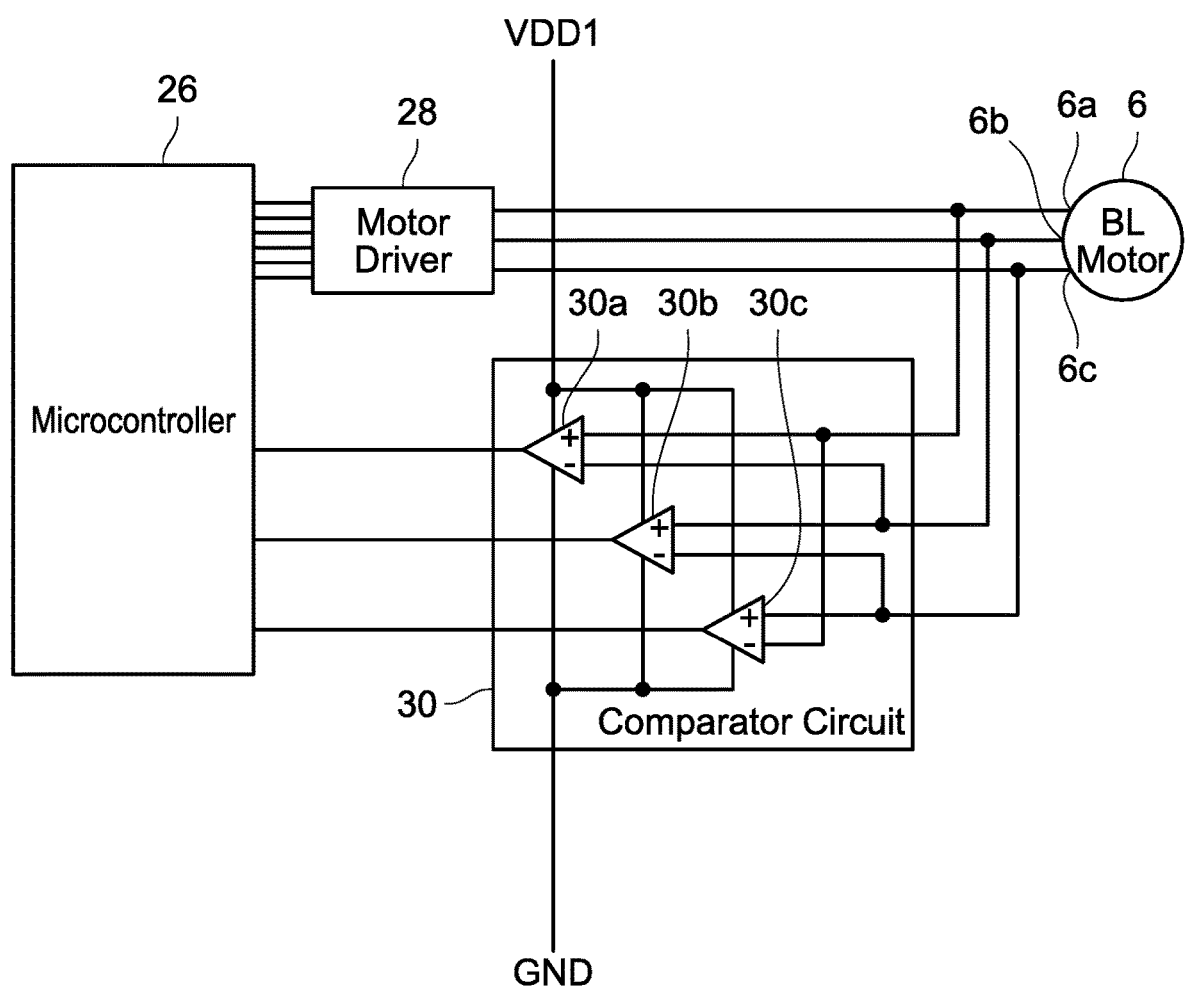
FIG. 4 shows an exemplary circuit configuration of a comparator circuit 30 according to the first embodiment.

As shown in FIG. 4, the comparator circuit 30 includes a first comparator 30a, a second comparator 30b, and a third comparator 30c. The first comparator 30a, the second comparator 30b, and the third comparator 30c are, for example, operational amplifiers. All of the first comparator 30a, the second comparator 30b, and the third comparator 30c have their positive supply terminals connected to the first potential VDD1 of power supply and have their negative supply terminals connected to the ground potential GND. In the first comparator 30a, its non-inverting input terminal is connected to the first phase terminal 6a of the brushless motor 6, its inverting input terminal is connected to the second phase terminal 6b of the brushless motor 6, and its output terminal is connected to the microcontroller 26 as a first comparator output. In the second comparator 30b, its non-inverting input terminal is connected to the second phase terminal 6b of the brushless motor 6, its inverting input terminal is connected to the third phase terminal 6c of the brushless motor 6, and its output terminal is connected to the microcontroller 26 as a second comparator output. In the third comparator 30c, its non-inverting input terminal is connected to the third phase terminal 6c of the brushless motor 6, its inverting input terminal is connected to the first phase terminal 6a of the brushless motor 6, and its output terminal is connected to the microcontroller 26 as a third comparator output.

As shown in FIG. 7, the first comparator output inputted to the microcontroller 26 from the first comparator 30a has a High potential when the voltage of the first phase terminal 6a is greater than the voltage of the second phase terminal 6b, while it has a Low potential when the voltage of the first phase terminal 6a is less than the voltage of the second phase terminal 6b. The second comparator output inputted to the microcontroller 26 from the second comparator 30b has a High potential when the voltage of the second phase terminal 6b is greater than the voltage of the third phase terminal 6c, while it has a Low potential when the voltage of the second phase terminal 6b is less than the voltage of the third phase terminal 6c. The third comparator output inputted to the microcontroller 26 from the third comparator 30c has a High potential when the voltage of the third phase terminal 6c is greater than the voltage of the first phase terminal 6a, while it has a Low potential when the voltage of the third phase terminal 6c is less than the voltage of the first phase terminal 6a.

In the motor controller 10 of the present embodiment, the microcontroller 26 starts the short-circuit braking operation at a timing T1 when one of the first comparator output, the second comparator output, and the third comparator output inverts, that is, when two of the first phase terminal 6a, the second phase terminal 6b, and the third phase terminal 6c have the same potential. Starting the short-circuit braking operation at the timing T1 as described suppresses concentration of inrush current flow in one of the lower switching elements 34 in the time period from the start of the short-circuit braking operation to the timing when the electrical angle increases by 180 degrees, thus can lower the maximum value of the inrush currents.

To detect a timing when the induced voltages in two of the first phase terminal 6a, the second phase terminal 6b, and the third phase terminal 6c become equal to each other by the first comparator 30a, the second comparator 30b, and the third comparator 30c during inertial rotation of the brushless motor 6, the induced voltages at that timing need to be in a range detectable by the first comparator 30a, the second comparator 30b, and the third comparator 30c. In the present embodiment, the positive supply terminals of the first comparator 30a, the second comparator 30b, and the third comparator 30c are connected to the first potential VDD1 of power supply, and the negative supply terminals thereof are connected to the ground potential GND. Further, the reference potential VREF of the brushless motor 6 is set at an intermediate potential between the first potential VDD1 of power supply and the ground potential GND by the resistors R1, R2, R3, R4, and R5. Due to this, a timing when the induced voltages in two of the first phase terminal 6a, the second phase terminal 6b, and the third phase terminal 6c become equal to each other during inertial rotation of the brushless motor 6 can be detected by the first comparator 30a, the second comparator 30b, and the third comparator 30c.

In a case where the microcontroller 26 can identify, from the detection signals of the Hall sensor 8, a timing when a center position in one of the teeth 18a faces a position in one of the magnetic poles 16 that has a largest magnetic flux density, the microcontroller 26 may start the short-circuit braking operation at that timing. Starting the short-circuit braking operation at this timing also suppresses concentration of inrush current flow in one of the lower switching elements 34 in the time period from the start of the short-circuit braking operation to the timing when the electrical angle increases by 180 degrees, thus can lower the maximum value of the inrush currents. By configuring as above, the microcontroller 26 can start the short-circuit braking operation at a timing that can reduce the maximum value of the inrush currents without using the comparator circuit 30. The above-described timing can be expressed, in other words, as a timing when absolute values of flux variations in two of the tooth 18a on which the first coil 20a is wound, the tooth 18a on which the second coil 20b is wound, and the tooth 18a on which the third coil 20c is wound become equal to each other.

Second Embodiment

Figure 12:
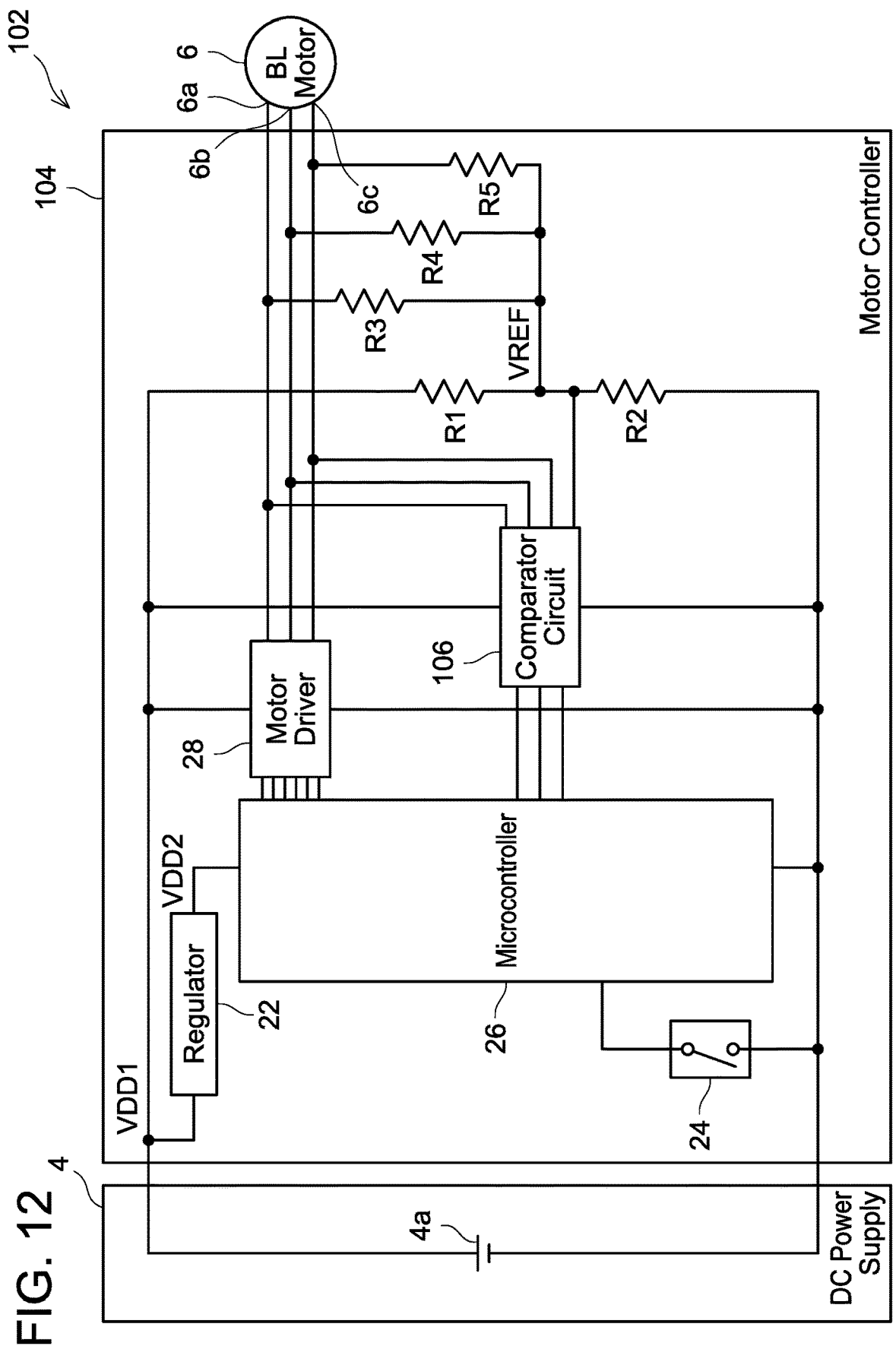
FIG. 12 shows an exemplary circuit configuration of an electric working machine 102 according to a second embodiment.

An electric working machine 102 shown in FIG. 12 includes almost the same configuration as that of the electric working machine 2 of the first embodiment. The electric working machine 102 includes a motor controller 104, instead of the motor controller 10. The motor controller 104 includes a comparator circuit 106 instead of the comparator circuit 30. Further, the electric working machine 102 does not include the Hall sensor 8. Instead, in the electric working machine 102 of the present embodiment, the microcontroller 26 of the motor controller 104 uses the comparator circuit 106 to identify a rotation angle of the rotor 12.

Figure 13:
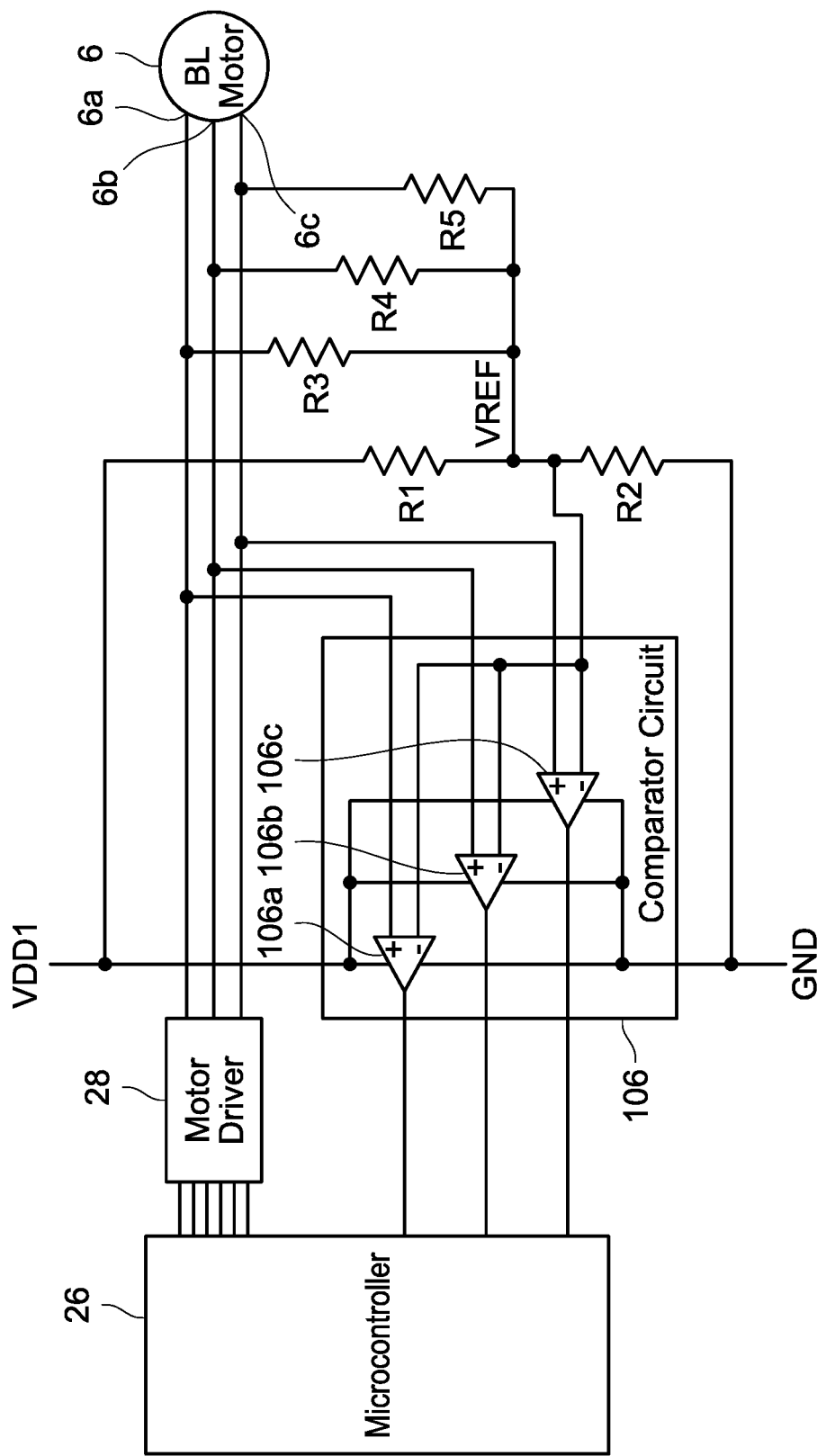
FIG. 13 shows an exemplary circuit configuration of a comparator circuit 106 according to the second embodiment.

As shown in FIG. 13, the comparator circuit 106 includes a first comparator 106a, a second comparator 106b, and a third comparator 106c. The first comparator 106a, the second comparator 106b, and the third comparator 106c are, for example, operational amplifiers. All of the first comparator 106a, the second comparator 106b, and the third comparator 106c have their positive supply terminals connected to the first potential VDD1 of power supply and have their negative supply terminals connected to the ground potential GND. In the first comparator 106a, its non-inverting input terminal is connected to the first phase terminal 6a of the brushless motor 6, its inverting input terminal is connected to the reference potential VREF of the brushless motor 6, and its output terminal is connected to the microcontroller 26 as a first comparator output. In the second comparator 106b, its non-inverting input terminal is connected to the second phase terminal 6b of the brushless motor 6, its inverting input terminal is connected to the reference potential VREF of the brushless motor 6, and its output terminal is connected to the microcontroller 26 as a second comparator output. In the third comparator 106c, its non-inverting input terminal is connected to the third phase terminal 6c of the brushless motor 6, its inverting input terminal is connected to the reference potential VREF of the brushless motor 6, and its output terminal is connected to the microcontroller 26 as a third comparator output.

Figure 14:
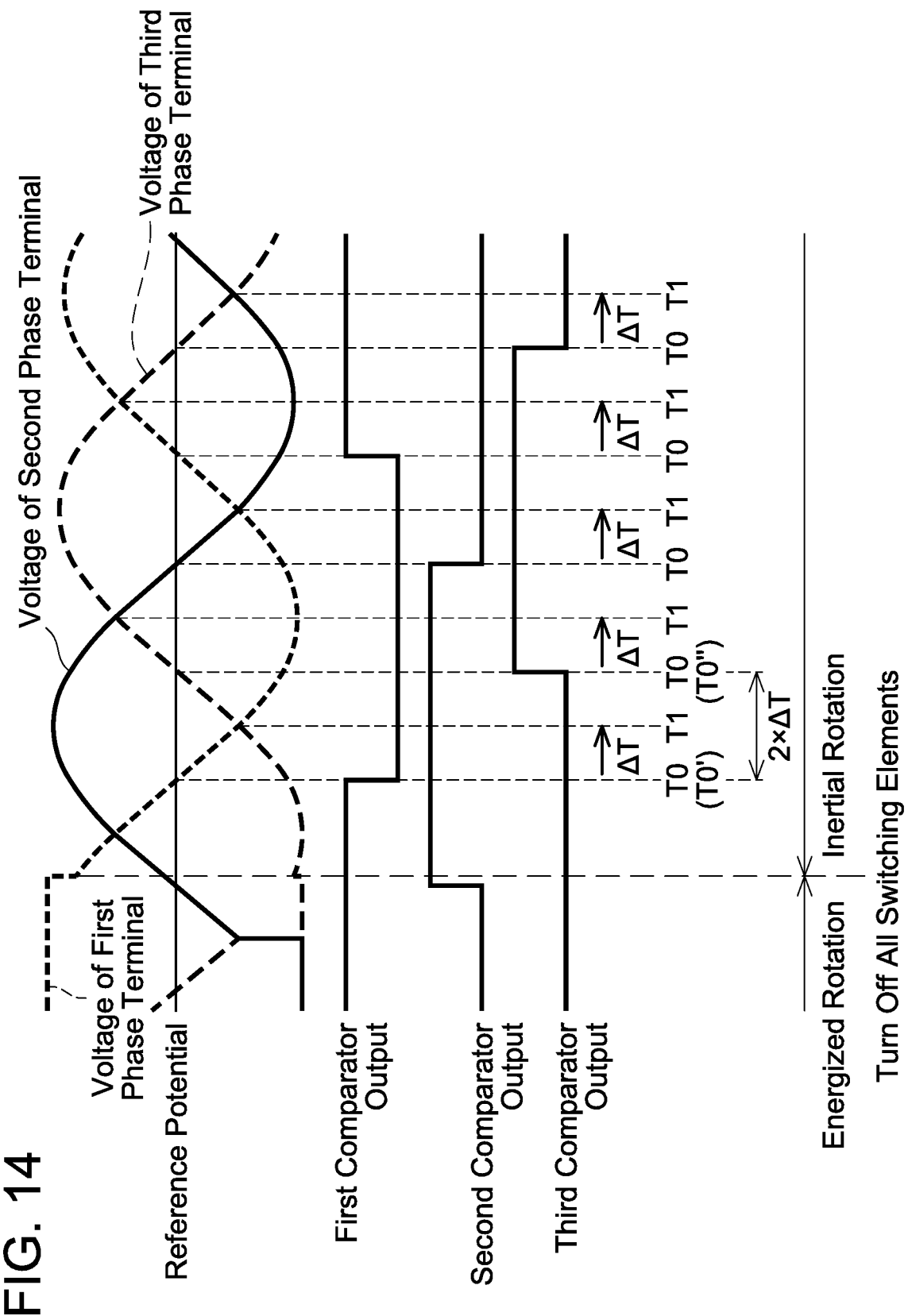
FIG. 14 shows a timing chart of the second embodiment indicating relationships between induced voltages of the first phase terminal 6a, the second phase terminal 6b, and the third phase terminal 6c while the brushless motor 6 is rotating by inertia and outputs from the comparator circuit 106.

As shown in FIG. 14, the first comparator output inputted to the microcontroller 26 from the first comparator 106a has a High potential when the voltage of the first phase terminal 6a is greater than the reference potential VREF, while it has a Low potential when the voltage of the first phase terminal 6a is less than the reference voltage VREF. The second comparator output inputted to the microcontroller 26 from the second comparator 106b has a High potential when the voltage of the second phase terminal 6b is greater than the reference voltage VREF, while it has a Low potential when the voltage of the second phase terminal 6b is less than the reference voltage VREF. The third comparator output inputted to the microcontroller 26 from the third comparator 106c has a High potential when the voltage of the third phase terminal 6c is greater than the reference voltage VREF, while it has a Low potential when the voltage of the third phase terminal 6c is less than the reference voltage VREF.

In the electric working machine 102 of the present embodiment, the microcontroller 26 is configured to detect a timing T0 when one of the first comparator output, the second comparator output, and the third comparator output inverts, that is, when an induced voltage in one of the first phase terminal 6a, the second phase terminal 6b, and the third phase terminal 6c becomes equal to the reference potential. In situation where the brushless motor 6 is rotating by inertia due to the microcontroller 26 having executed the de-energization operation, when the electrical angle increases by 30 degrees from the timing when the induced voltage in one of the first phase terminal 6a, the second phase terminal 6b, and the third phase terminal 6c became equal to the reference potential, the induced voltages in two of the first phase terminal 6a, the second phase terminal 6b, and the third phase terminal 6c become equal to each other. Thus, in the electric working machine 102 of the present embodiment, the microcontroller 26 starts the short-circuit braking operation at a timing T1 when a time period ΔT required for the electrical angle to increase by 30 degrees has elapsed from the above-described timing T0.

The microcontroller 26 firstly measures a time period 2×ΔT that is a time period from a timing T0' when the induced voltage in one of the first phase terminal 6a, the second phase terminal 6b, and the third phase terminal 6c becomes equal to the reference potential to a timing T0" when the induced voltage in another one of the first phase terminal 6a, the second phase terminal 6b, and the third phase terminal 6c becomes equal to the reference potential. The measured time period 2×ΔT is a time period required for the electrical angle to increase by 60 degrees. Next, the microcontroller 26 determines the time period ΔT required for the electrical angle to increase by 30 degrees from the time period 2×ΔT required for the electrical angle to increase by 60 degrees. Then, the microcontroller 26 starts the short-circuit braking operation at the timing T1 when the time period ΔT required for the electrical angle to increase by 30 degrees has elapsed from the timing T0 when the induced voltage in the one of the first phase terminal 6a, the second phase terminal 6b, and the third phase terminal 6c became equal to the reference potential. Starting the short-circuit braking operation at the timing T1 as described suppresses concentration of inrush current flow in one of the lower switching elements 34 in the time period from the start of the short-circuit braking operation to the timing when the electrical angle increases by 180 degrees, thus can lower a maximum value of the inrush currents.

In the above embodiments, the DC power supply 4 may be of any type as long as it can supply DC power. For example, the battery 4a of the DC power supply 4 may be a battery other than a secondary battery. Alternatively, the DC power supply 4 may be a battery housing that houses the battery 4a therein and is undetachably attached to the electric working machine 2. Alternatively, the DC power supply 4 may be a power circuit configured to convert AC power supplied from an external AC power supply (not shown) into DC power.

The brushless motor 6 may not be a brushless motor of an inner rotor type, and may be a brushless motor of an outer rotor type. The number of the magnetic poles 16 of the rotor 12 may be less than eight or may be more than eight. The number of the teeth 18a of the stator 14 may be less than twelve or may be more than twelve.

As described, in one or more embodiments, the electric working machine 2 may comprise the brushless motor 6 and the motor controller 10, 104 configured to control the brushless motor 6. The brushless motor 6 may include the rotor 12 including the plurality of magnetic poles 16, the stator 14 including the plurality of teeth 18a facing the rotor 12, and coils 20 wound around the teeth 18a and configured to generate magnetic forces in the teeth 18a according to voltages applied on the first phase terminal 6a, the second phase terminal 6b, and the third phase terminal 6c. The motor controller 10, 104 may include the first upper switching element 32a connecting the first phase terminal 6a and the first potential VDD1 of power supply (an example of positive-side potential of a power supply); the first lower switching element 34a connecting the first phase terminal 6a and the ground potential GND (an example of negative-side potential of the power supply); the second upper switching element 32b connecting the second phase terminal 6b and the first potential VDD1 of power supply; the second lower switching element 34b connecting the second phase terminal 6b and the ground potential GND; the third upper switching element 32c connecting the third phase terminal 6c and the first potential VDD1 of power supply; the third lower switching element 34c connecting the third phase terminal 6c and the ground potential GND; and the microcontroller 26 (an example of control unit) configured to switch each of the first upper switching element 32a, the first lower switching element 34a, the second upper switching element 32b, the second lower switching element 34b, the third upper switching element 32c, and the third lower switching element 34c between the conductive state and the non-conductive state. The microcontroller 26 may be configured to execute the short-circuit braking operation for applying the braking force to the brushless motor 6 by bringing the first upper switching element 32a, the second upper switching element 32b, and the third upper switching element 32c into the non-conductive state and bringing the first lower switching element 34a, the second lower switching element 34b, and the third lower switching element 34c into the conductive state. The microcontroller 26 may be configured to start the short-circuit braking operation at a predetermined timing. When the short-circuit braking operation is started at the predetermined timing, polarities of the induced voltages of the first phase terminal 6a, the second phase terminal 6b, and the third phase terminal 6c may be reversed by the time when the electrical angle of the brushless motor 6 increases by 180 degrees from the start of the short-circuit braking operation.

In one or more embodiments, the motor controller 10, 104 may be configured to control the brushless motor 6. The brushless motor 6 may include the rotor 12 including the plurality of magnetic poles 16, the stator 14 including the plurality of teeth 18a facing the rotor 12, and coils 20 wound around the teeth 18a and configured to generate magnetic forces in the teeth 18a according to voltages applied on the first phase terminal 6a, the second phase terminal 6b, and the third phase terminal 6c. The motor controller 10, 104 may comprise the first upper switching element 32a connecting the first phase terminal 6a and the first potential VDD1 of power supply (an example of positive-side potential of a power supply); the first lower switching element 34a connecting the first phase terminal 6a and the ground potential GND (an example of negative-side potential of a power supply); the second upper switching element 32b connecting the second phase terminal 6b and the first potential VDD1 of power supply; the second lower switching element 34b connecting the second phase terminal 6b and the ground potential GND; the third upper switching element 32c connecting the third phase terminal 6c and the first potential VDD1 of power supply; the third lower switching element 34c connecting the third phase terminal 6c and the ground potential GND; and the microcontroller 26 (an example of control unit) configured to switch each of the first upper switching element 32a, the first lower switching element 34a, the second upper switching element 32b, the second lower switching element 34b, the third upper switching element 32c, and the third lower switching element 34c between the conductive state and the non-conductive state. The microcontroller 26 may be configured to execute the short-circuit braking operation for applying a braking force to the brushless motor 6 by bringing the first upper switching element 32a, the second upper switching element 32b, and the third upper switching element 32c into the non-conductive state and bringing the first lower switching element 34a, the second lower switching element 34b, and the third lower switching element 34c into the conductive state. The microcontroller 26 may be configured to start the short-circuit braking operation at a predetermined timing. When the short-circuit braking operation is started at the predetermined timing, polarities of induced voltages of the first phase terminal 6a, the second phase terminal 6b, and the third phase terminal 6c may be reversed by the time when the electrical angle of the brushless motor 6 increased by 180 degrees from the start of the short-circuit braking operation.

In the above configuration, the short-circuit braking operation is started at the timing when the polarities of the induced voltages of the first phase terminal 6a, the second phase terminal 6b, and the third phase terminal 6c are reversed before the electrical angle of the brushless motor 6 increases by 180 degrees, thus the maximum value of the inrush currents in the short-circuit braking operation can be lowered.

In one or more embodiments, before executing the short-circuit braking operation, the microcontroller 26 may be configured to execute the de-energization operation for bringing the first upper switching element 32a, the first lower switching element 34a, the second upper switching element 32b, the second lower switching element 34b, the third upper switching element 32c, and the third lower switching element 34c into the non-conductive state. The microcontroller 26 may be configured to start the short-circuit braking operation at the timing when the induced voltages of two of the first phase terminal 6a, the second phase terminal 6b, and the third phase terminal 6c become substantially equal to each other after the de-energization operation.

In one or more embodiments, the electric working machine 2 may comprise the brushless motor 6 and the motor controller 10, 104 configured to control the brushless motor 6. The brushless motor 6 may include the rotor 12 including the plurality of magnetic poles 16, the stator 14 including the plurality of teeth 18a facing the rotor 12, and the coils 20 wound around the teeth 18a and configured to generate magnetic forces in the teeth 18a according to voltages applied on the first phase terminal 6a, the second phase terminal 6b, and the third phase terminal 6c. The motor controller 10, 104 may include the first upper switching element 32a connecting the first phase terminal 6a and the first potential VDD1 of power supply (an example of positive-side potential of a power supply); the first lower switching element 34a connecting the first phase terminal 6a and the ground potential GND (an example of negative-side potential of the power supply); the second upper switching element 32b connecting the second phase terminal 6b and the first potential VDD1 of power supply; the second lower switching element 34b connecting the second phase terminal 6b and the ground potential GND; the third upper switching element 32c connecting the third phase terminal 6c and the first potential VDD1 of power supply; the third lower switching element 34c connecting the third phase terminal 6c and the ground potential GND; and the microcontroller 26 (an example of control unit) configured to switch each of the first upper switching element 32a, the first lower switching element 34a, the second upper switching element 32b, the second lower switching element 34b, the third upper switching element 32c, and the third lower switching element 34c between the conductive state and the non-conductive state. The microcontroller 26 may be configured to execute the short-circuit braking operation for applying a braking force to the brushless motor 6 by bringing the first upper switching element 32a, the second upper switching element 32b, and the third upper switching element 32c into the non-conductive state and bringing the first lower switching element 34a, the second lower switching element 34b, and the third lower switching element 34c into the conductive state. Before executing the short-circuit braking operation, the microcontroller 26 may be configured to execute the de-energization operation for bringing the first upper switching element 32a, the first lower switching element 34a, the second upper switching element 32b, the second lower switching element 34b, the third upper switching element 32c, and the third lower switching element 34c into the non-conductive state. The microcontroller 26 may be configured to start the short-circuit braking operation at the timing when the induced voltages of two of the first phase terminal 6a, the second phase terminal 6b, and the third phase terminal 6c become substantially equal to each other after the de-energization operation.

The above-described configuration can suppress concentration of inrush current flow in one of the lower switching elements 34 in the short-circuit braking operation, thus it can significantly lower the maximum value of the inrush currents.

In one or more embodiments, the motor controller 10 may further include one of the first comparator 30a, the second comparator 30b, and the third comparator 30c (an example of comparator) configured to compare the induced voltages of two of the first phase terminal 6a, the second phase terminal 6b, and the third phase terminal 6c with each other. The microcontroller 26 may be configured to start the short-circuit braking operation at the timing when the output of the one of the first comparator 30a, the second comparator 30b, and the third comparator 30c is inverted after the de-energization operation.

The above configuration enables the timing when the short-circuit braking operation is started to accurately coincide with the timing when the induced voltages of the two of the first phase terminal 6a, the second phase terminal 6b, and the third phase terminal 6c become equal to each other.

In one or more embodiments, the motor controller 104 may further include one of the first comparator 106a, the second comparator 106b, and the third comparator 106c (an example of first comparator) configured to compare the reference potential with the induced voltage of one of the first phase terminal 6a, the second phase terminal 6b, and the third phase terminal 6c. The microcontroller 26 may be configured to start the short-circuit braking operation at the timing when the electrical angle of the brushless motor 6 increases by 30 degrees from inversion of an output of the one of the first comparator 106a, the second comparator 106b, the third comparator 106c after the de-energization operation.

In situation where the brushless motor 6 is rotating by inertia, when the electrical angle increases by 30 degrees from the timing when the reference potential became equal to the induced voltage of one of the first phase terminal 6a, the second phase terminal 6b, and the third phase terminal 6c, the induced voltages of two of the first phase terminal 6a, the second phase terminal 6b, and the third phase terminal 6c become equal to each other. Thus, the above configuration enables the timing when the short-circuit braking operation is started to accurately coincide with the timing when the induced voltages of the two of the first phase terminal 6a, the second phase terminal 6b, and the third phase terminal 6c become equal to each other.

In one or more embodiments, the motor controller 104 may further include another one of the first comparator 106a, the second comparator 106b, and the third comparator 106c (an example of second comparator) configured to compare the reference potential with the induced voltage of another one of the first phase terminal 6a, the second phase terminal 6b, and the third phase terminal 6c. The microcontroller 26 may be configured to determine the time period required for the electrical angle of the brushless motor 6 to increase by 30 degrees based on a time period from the timing when the output of one of the first comparator 106a, the second comparator 106b, the third comparator 106c is inverted after the de-energization operation to the timing when the output of the other one of the first comparator 106a, the second comparator 106b, and the third comparator 106c is inverted after the de-energization operation.

In situation where the brushless motor 6 is rotating by inertia, when the electrical angle increases by 60 degrees from the timing when the reference potential became equal to the induced voltage of one of the first phase terminal 6a, the second phase terminal 6b, and the third phase terminal 6c, the induced voltage of the other one of the first phase terminal 6a, the second phase terminal 6b, and the third phase terminal 6c becomes equal to the reference potential. Thus, by measuring the time period from the timing when the reference potential becomes equal to the induced voltage of one of the first phase terminal 6a, the second phase terminal 6b, and the third phase terminal 6c to the timing when the reference potential becomes equal to the induced voltage of another one of the first phase terminal 6a, the second phase terminal 6b, and the third phase terminal 6c, a time period required for the electrical angle to increase by 60 degrees can be determined and a time period required for the electrical angle to increase by 30 degrees can also be determined from that determined time period. The above configuration can accurately determine the time period required for the electrical angle to increase by 30 degrees in the actual brushless motor 6.

In one or more embodiments, the brushless motor 6 may further include the first Hall element 8a, the second Hall element 8b, and the third Hall element 8c (an example of Hall element) configured to detect the changes in the magnetic forces from the rotor 12. The positions of the first Hall element 8a, the second Hall element 8b, and the third Hall element 8c relative to the stator 14 may be fixed. The microcontroller 26 may be configured to determine the timing when one of the magnetic poles 16 of the rotor 12 faces one of the teeth 18a of the stator 14 based on the detection signals from the first Hall element 8a, the second Hall element 8b, and the third Hall element 8c and start the short-circuit braking operation at the determined timing.

In situation where the brushless motor 6 is rotating by inertia, the timing when the induced voltages of two of the first phase terminal 6a, the second phase terminal 6b, and the third phase terminal 6c become equal to each other is also the timing when one of the magnetic poles 16 of the rotor 12 faces one of the teeth 18a of the stator 14. In the above configuration, the first Hall element 8a, the second Hall element 8b, and the third Hall element 8c are used to determine the timing when one of the magnetic poles 16 of the rotor 12 faces one of the teeth 18a of the stator 14 and the short-circuit braking operation is started at the determined timing. The above configuration can suppress concentration of inrush current flow in one of the lower switching elements 34 in the short-circuit braking operation, thus it can significantly lower the maximum value of inrush currents.

What is claimed is:

1. An electric working machine, comprising:
   a brushless motor; and
   a motor controller configured to control the brushless motor,
   wherein
   the brushless motor includes:
   a rotor including a plurality of magnetic poles;
   a stator including a plurality of teeth facing the rotor; and
   coils wound around the teeth, the coils being configured to generate magnetic forces in the teeth according to voltages applied on a first phase terminal, a second phase terminal, and a third phase terminal,
   the motor controller includes:
   a first upper switching element connecting the first phase terminal and a positive-side potential of a power supply;
   a first lower switching element connecting the first phase terminal and a negative-side potential of the power supply;
   a second upper switching element connecting the second phase terminal and the positive-side potential of the power supply;
   a second lower switching element connecting the second phase terminal and the negative-side potential of the power supply;
   a third upper switching element connecting the third phase terminal and the positive-side potential of the power supply;
   a third lower switching element connecting the third phase terminal and the negative-side potential of the power supply; and
   a control unit configured to switch each of the first upper switching element, the first lower switching element, the second upper switching element, the second lower switching element, the third upper switching element, and the third lower switching element between a conductive state and a non-conductive state,
   the control unit is configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state,
   the control unit is configured to start the short-circuit braking operation at a predetermined timing,
   when the short-circuit braking operation is started at the predetermined timing, polarities of induced voltages of the first phase terminal, the second phase terminal, and the third phase terminal are reversed by a time when an electrical angle of the brushless motor increases by 180 degrees from the start of the short-circuit braking operation.

2. The electric working machine according to claim 1, wherein
   before executing the short-circuit braking operation, the control unit is configured to execute a de-energization operation for bringing the first upper switching element, the first lower switching element, the second upper switching element, the second lower switching element, the third upper switching element, and the third lower switching element into the non-conductive state, and
   the control unit is configured to start the short-circuit braking operation at a timing when the induced voltages of two of the first phase terminal, the second phase terminal, and the third phase terminal become substantially equal to each other after the de-energization operation.

3. The electric working machine according to claim 2, wherein
   the motor controller further includes a comparator configured to compare the induced voltages of the two of the first phase terminal, the second phase terminal, and the third phase terminal with each other, and
   the control unit is configured to start the short-circuit braking operation at a timing when an output of the comparator is inverted after the de-energization operation.

4. The electric working machine according to claim 2, wherein the motor controller further includes a first comparator configured to compare a reference potential with the induced voltage of one of the first phase terminal, the second phase terminal, and the third phase terminal, and the control unit is configured to start the short-circuit braking operation at a timing when the electrical angle of the brushless motor increases by 30 degrees from inversion of an output of the first comparator after the de-energization operation.

5. The electric working machine according to claim 4, wherein the motor controller further includes a second comparator configured to compare the reference voltage with the induced voltage of another one of the first phase terminal, the second phase terminal, and the third phase terminal, and the control unit is configured to determine a time period required for the electrical angle of the brushless motor to increase by 30 degrees based on a time period between a timing when the output of the first comparator is inverted after the de-energization operation and a timing when an output of the second comparator is inverted after the de-energization operation.

6. The electric working machine according to claim 1, wherein the brushless motor further includes a Hall element configured to detect a change in a magnetic force from the rotor, wherein a position of the Hall element relative to the stator is fixed, and the control unit is configured to determine a timing when one of the magnetic poles of the rotor faces one of the teeth of the stator based on a detection signal from the Hall element and start the short-circuit braking operation at the determined timing.

7. An electric working machine, comprising:

a brushless motor; and a motor controller configured to control the brushless motor, wherein the brushless motor includes:
a rotor including a plurality of magnetic poles;
a stator including a plurality of teeth facing the rotor; and
coils wound around the teeth, the coils being configured to generate magnetic forces in the teeth according to voltages applied on a first phase terminal, a second phase terminal, and a third phase terminal, the motor controller includes:
a first upper switching element connecting the first phase terminal and a positive-side potential of a power supply;
a first lower switching element connecting the first phase terminal and a negative-side potential of the power supply;
a second upper switching element connecting the second phase terminal and the positive-side potential of the power supply;
a second lower switching element connecting the second phase terminal and the negative-side potential of the power supply;
a third upper switching element connecting the third phase terminal and the positive-side potential of the power supply;
a third lower switching element connecting the third phase terminal and the negative-side potential of the power supply; and a control unit configured to switch each of the first upper switching element, the first lower switching element, the second upper switching element, the second lower switching element, the third upper switching element, and the third lower switching element between a conductive state and a non-conductive state, the control unit is configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state, before executing the short-circuit braking operation, the control unit is configured to execute a de-energization operation for bringing the first upper switching element, the first lower switching element, the second upper switching element, the second lower switching element, the third upper switching element, and the third lower switching element into the non-conductive state, and the control unit is configured to start the short-circuit braking operation at a timing when induced voltages of two of the first phase terminal, the second phase terminal, and the third phase terminal become substantially equal to each other after the de-energization operation.

8. The electric working machine according to claim 7, wherein the motor controller further includes a comparator configured to compare the induced voltages of the two of the first phase terminal, the second phase terminal, and the third phase terminal with each other, and the control unit is configured to start the short-circuit braking operation at a timing when an output of the comparator is inverted after the de-energization operation.

9. The electric working machine according to claim 7, wherein the motor controller further includes a first comparator configured to compare a reference potential with the induced voltage of one of the first phase terminal, the second phase terminal, and the third phase terminal, and the control unit is configured to start the short-circuit braking operation at a timing when an electrical angle of the brushless motor increases by 30 degrees from inversion of an output of the first comparator after the de-energization operation.

10. The electric working machine according to claim 9, wherein the motor controller further includes a second comparator configured to compare the reference potential with the induced voltage of another one of the first phase terminal, the second phase terminal, and the third phase terminal, and the control unit is configured to determine a time period required for the electrical angle of the brushless motor to increase by 30 degrees based on a time period from a timing when the output of the first comparator is inverted after the de-energization operation to a timing when an output of the second comparator is inverted after the de-energization operation.

11. A motor controller configured to control a brushless motor, wherein the brushless motor includes:
- a rotor including a plurality of magnetic poles;
- a stator including a plurality of teeth facing the rotor; and
- coils wound around the teeth, the coils being configured to generate magnetic forces in the teeth according to voltages applied on a first phase terminal, a second phase terminal, and a third phase terminal, the motor controller comprises:
- a first upper switching element connecting the first phase terminal and a positive-side potential of a power supply;
- a first lower switching element connecting the first phase terminal and a negative-side potential of a power supply;
- a second upper switching element connecting the second phase terminal and the positive-side potential of the power supply;
- a second lower switching element connecting the second phase terminal and the negative-side potential of the power supply;
- a third upper switching element connecting the third phase terminal and the positive-side potential of the power supply;
- a third lower switching element connecting the third phase terminal and the negative-side potential of the power supply; and
- a control unit configured to switch each of the first upper switching element, the first lower switching element, the second upper switching element, the second lower switching element, the third upper switching element, and the third lower switching element between a conductive state and a non-conductive state, the control unit is configured to execute a short-circuit braking operation for applying a braking force to the brushless motor by bringing the first upper switching element, the second upper switching element, and the third upper switching element into the non-conductive state and bringing the first lower switching element, the second lower switching element, and the third lower switching element into the conductive state, the control unit is configured to start the short-circuit braking operation at a predetermined timing, and when the short-circuit braking operation is started at the predetermined timing, polarities of induced voltages of the first phase terminal, the second phase terminal, and the third phase terminal are reversed by a time when an electrical angle of the brushless motor increases by 180 degrees from the start of the short-circuit braking operation.

* * * * *